United States Patent [19]

Eberle

[11] 4,370,803

[45] Feb. 1, 1983

[54] METHOD FOR ENVELOPING THE PLATES OF AN AUTOMOTIVE STORAGE BATTERY WITH SEPARATOR MATERIAL

[75] Inventor: William J. Eberle, Reading, Pa.

[73] Assignee: General Battery Corporation, Reading, Pa.

[21] Appl. No.: 208,756

[22] Filed: Nov. 20, 1980

Related U.S. Application Data

[60] Continuation of Ser. No. 59,258, Jul. 20, 1979, abandoned, which is a continuation of Ser. No. 868,049, Jan. 9, 1978, abandoned, which is a division of Ser. No. 771,569, Feb. 24, 1977, Pat. No. 4,080,732.

[51] Int. Cl.³ .................. B23P 15/00; B23P 19/04
[52] U.S. Cl. ................................. 29/623.4; 29/730; 493/399
[58] Field of Search ............... 29/623.1, 623.2, 623.3, 29/623.4, 730, 731; 53/231, 232, 233, 228; 156/483, 484, 485, 521, 556, 569, 570, 516, 517; 493/396-399

[56] References Cited

U.S. PATENT DOCUMENTS

| | | | |
|---|---|---|---|
| 1,999,314 | 4/1935 | Anderson | 493/397 |
| 2,373,082 | 4/1945 | Staelin | 29/730 |
| 2,624,106 | 1/1953 | Lund | 29/730 |
| 2,853,839 | 9/1958 | Herrmann | 53/234 |
| 3,022,615 | 2/1962 | Schroeder et al. | 53/458 |
| 3,039,372 | 6/1962 | Bombard | 493/396 |
| 3,738,898 | 6/1973 | Lowe et al. | 156/583 |
| 3,892,620 | 7/1975 | Heussy | 29/623.4 |
| 3,900,341 | 8/1975 | Shoichiro et al. | 29/623.2 |
| 4,026,000 | 5/1977 | Anderson | 29/730 |
| 4,069,079 | 1/1978 | Eggert | 29/730 |
| 4,129,065 | 12/1978 | Corse | 493/396 |

Primary Examiner—Daniel C. Crane
Attorney, Agent, or Firm—Benasutti Associates, Ltd.

[57] ABSTRACT

A method for forming lead-acid storage battery separator envelopes from a continuous roll of separator material of the type having ribs thereon. The method comprises withdrawing the separator material from the roll and clamping the withdrawn separator material along the length thereof to crush and deform the separator material ribs and produce two creases across the width thereof. The creases are spaced from each other approximately the thickness of a pasted battery plate. The clamping is released and the edge of a plate narrower in width than the separator material is introduced into contact with the separator material at the crushed and deformed portion thereof between the spaced creases. Thereafter the withdrawn separator material is folded along the length of the plate, so that the material overlaps the edges of said plate. Finally, the overlapped edges are sealed to each other.

9 Claims, 11 Drawing Figures

METHOD FOR ENVELOPING THE PLATES OF AN AUTOMOTIVE STORAGE BATTERY WITH SEPARATOR MATERIAL

This is a continuation of application Ser. No. 59,258, filed July 20, 1979 (now abandoned) which was a continuation of application Ser. No. 868,049 filed Jan. 9, 1978 (now abandoned) which was a Divisional of application Ser. No. 771,569 filed Feb. 24, 1977, now U.S. Pat. No. 4,080,732, dated Mar. 28, 1978.

BACKGROUND OF THE INVENTION

It is often desired to wrap the separator material around either the positive or negative plates of an automotive storage battery and to seal the separator material around the edges of those plates so that in the event of misalignment or build-up of active material at the bottom of the battery during use, shorting such as treeing, mossing, etc. will not develop. Accordingly, storage batteries, and particularly automotive storage batteries, wherein either the positive or negative plates are encased in separator envelopes may utilize correspondingly lower rest-ups without danger that accumulated material on the bottom of the battery case will cause shorting and premature failure of the battery.

Since the advent of the storage battery industry, virtually hundreds of different materials have been suggested for use as separator material. For many years, wood was the material of choice, after which various paper materials received widespread acceptance. More recently, microporous synthetic separator materials have all but displaced previous separator materials, due in large part to the superior characteristics exhibited by these new materials. One such synthetic separator material which has gained widespread acceptance is marketed under the tradename "Duramic" and basically comprises a thin sheet of material having a plurality of longitudinal ridges disposed on one side thereof which, for automotive storage batteries, are spaced approximately one-half inch apart. Although the precise composition of the separator material is not widely known, it is a polymeric, polyvinylchloride-like material containing substantial amounts of diatomaceous earths which are carefully manufactured to control preferred microporosities.

This common type of separator material is formed with sharp, substantially rectangular, longitudinal ridges on a first side, while on the opposite side of the separator surface, a much flatter, slightly undulating surface is presented, which structure tends to add to the overall longitudinal rigidity of the separator material.

Several different machines have been proposed for enveloping plates of automotive storage batteries, most of which machines focus on the idea of taking strips cut from a continuous length of separator material and shoving a plate into a slot or similar opening over which the separator material has been placed, so as to fold the separator material from the bottom of the plate up over the face of the plate with the edges of separator material extending beyond the side edges of the plate. The separator material, which is somewhat wider than the plate, and which edges overlap the sides of the plate, may be ultrasonically welded or may be transferred to a different station for other sealing, such as gluing or heat sealing.

Unfortunately, due to the particular nature of the diatomaceous earth and other materials used in making the separator material, variation in the quality of the separator material to be joined have created substantial difficulties in using ultrasonic sealing techniques. Alternatively, some problems have been encountered in attempting to use a direct contact heat sealing approach due to the fact that substantial pressures, in the order of 4,000 pounds per square inch of contact area must be applied to effect a good seal, while at the same time, the contact surfaces must not stick to the softened material upon withdrawal therefrom. In order to overcome there difficulties, it has been known to apply spray silicone coatings or Teflon coatings to the contact melting surfaces for the purpose of creating an anti-stick surface. Unfortunately, the extreme pressures exerted between the melting surfaces during the sealing process encourage foreign material, dust particles, lead shavings and other contaminants to become embedded in the various anti-stick coatings which may be applied to the sealing surfaces. Consequently, upon withdrawal of the softened separator material away from the contact melting surface, portions of the softened separator material tend to adhere to this foreign material and be pulled from the separator, resulting in a defective product. Accordingly, to counteract this tendency, Teflon surfaces, which tend to decompose under conditions of heat and pressure, need to be replaced or resurfaced frequently, while silicone coatings need to be renewed as often as every several hours in order to overcome the aforementioned problems.

SUMMARY OF THE INVENTION

The present invention provides a novel apparatus and method for producing battery plate envelopes composed of microporous separator material, and more particularly for enveloping pasted (but unformed) battery plates in that separator material prior to assembly of those plates into groups or elements. Basically, separator material is fed from a large roll into a separator processing plane, in which plane the separator material is pre-creased, cut to size and located over a slot-like folding means. Pre-pasted battery plates are fed into a shuttle mechanism and generally are caused to travel transversely with respect to said separator processing plane to engage the separator material at its pre-creased position with the bottom edge of the battery plate and force the separator material and the plate along the aforementioned transverse plane so that the separator material folds around the plane and is subsequently moved between a pair of heat-sealing jaws, each of which move to heat seal protruding edges of separator material together along the sides of the plate, so that the plate is sealed within an envelope on three sides. The enveloped plate then is pulled further along the transverse plane by an extractor shuttle which is adapted to receive each plate after folding, and to remove each enveloped plate from between the sealing jaws after heated sealing, and then to drop each plate onto an output means, such as an output conveyor.

Accordingly, a primary object of the present invention is the provision of a reliable apparatus for enveloping pre-pasted battery plates in microporous battery separator material.

Another object of the present invention is the provision of a method for enveloping battery plates which is rapid, efficient and reliable. Another aim of the present invention is the provision of an apparatus which is capable of producing envelopes of microporous separator material into which pre-pasted battery plates may later be inserted.

A further aim of the present invention is the provision of contact melting surfaces which are durable, possess excellent heat transfer characteristics and do not stick to softened separator material which is drawn away therefrom.

These and other objects of the present invention will become apparent from the following more detailed description.

DETAILED DESCRIPTION OF THE DRAWINGS

Although specific forms of the invention have been selected for illustration in the drawings, and the following description is drawn is specific terms for the purpose of describing these forms of the invention, this description is not intended to limit the scope of the invention which is defined in the appended claims.

Figure 1:
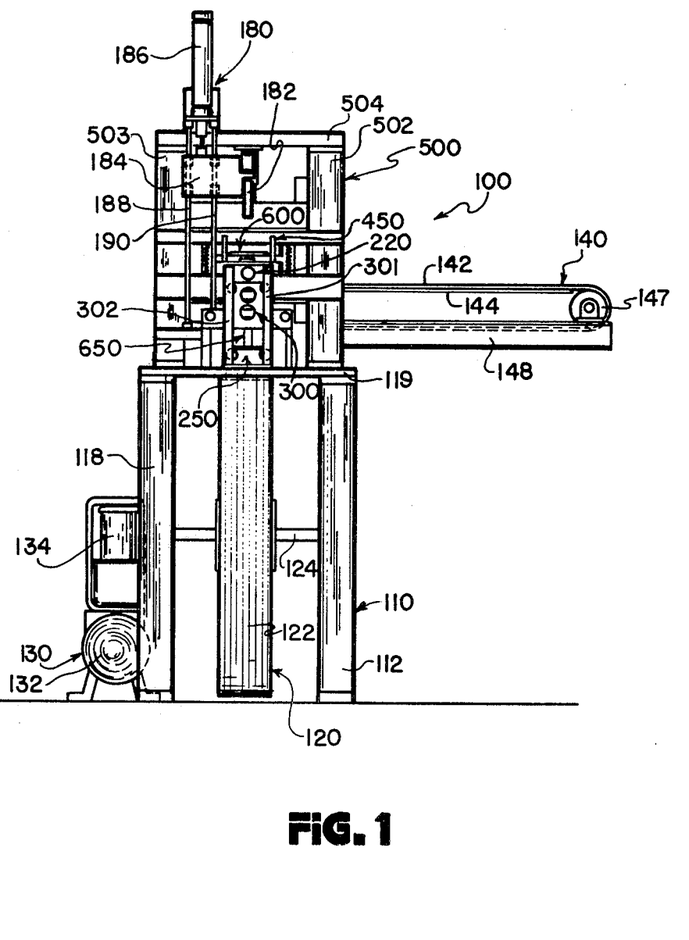
FIG. 1 is a front elevation of the preferred embodiment of the present invention generally illustrating the input side of the apparatus.

Referring to the drawings, and more particularly to FIG. 1, the preferred embodiment battery plate enveloping machine designated generally 100 is illustrated. This apparatus generally comprises a base designated generally 110, a material feed means for supplying material from the feed roll for use in said envelopes, designated generally 120, a compressor means designated generally 130 for supplying power to the remainder of the apparatus, an output means designated generally 140, a draw means for drawing preselected lengths of separator material into a processing position, designated generally 180; an injector shuttle means designated generally 220 for successively bringing battery plates into contact with separator material located at said processing position and for forcing said plates through a confined opening and a material guide means designated generally 650 for maintaining separator material in the desired position between and during process operations.

Figure 2:
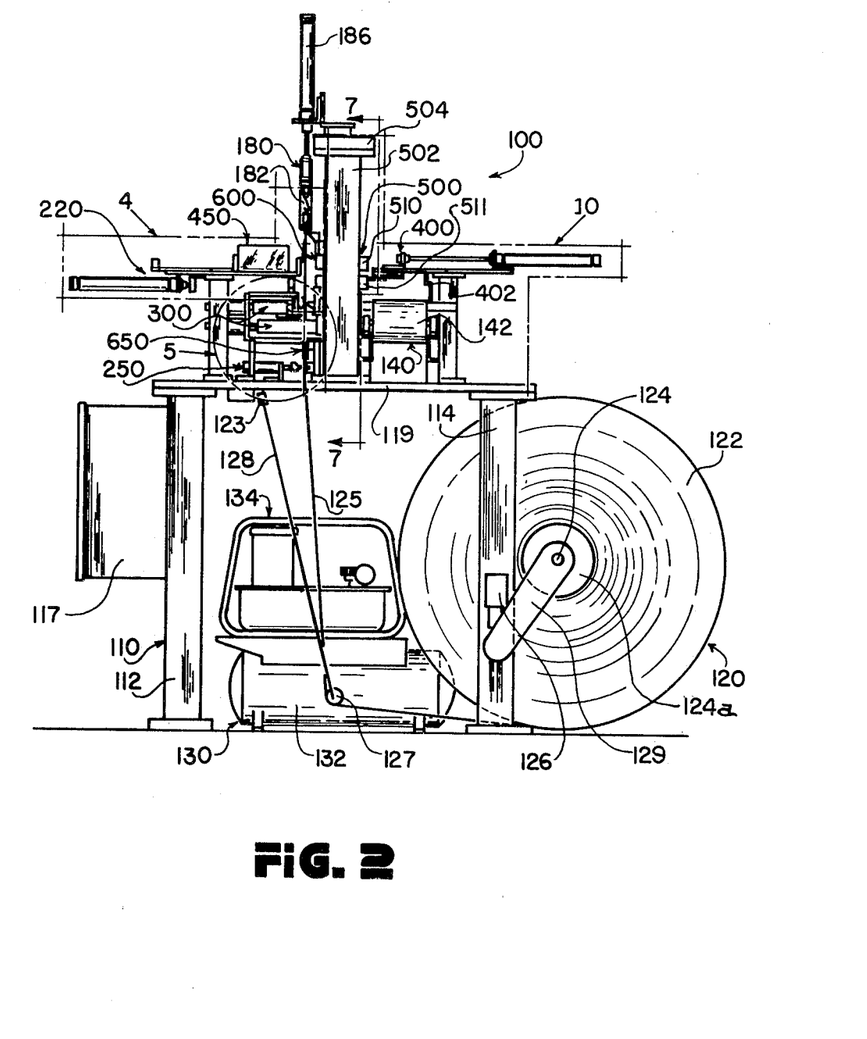
FIG. 2 is a side elevation of the apparatus illustrated in FIG. 1.
Figure 3:
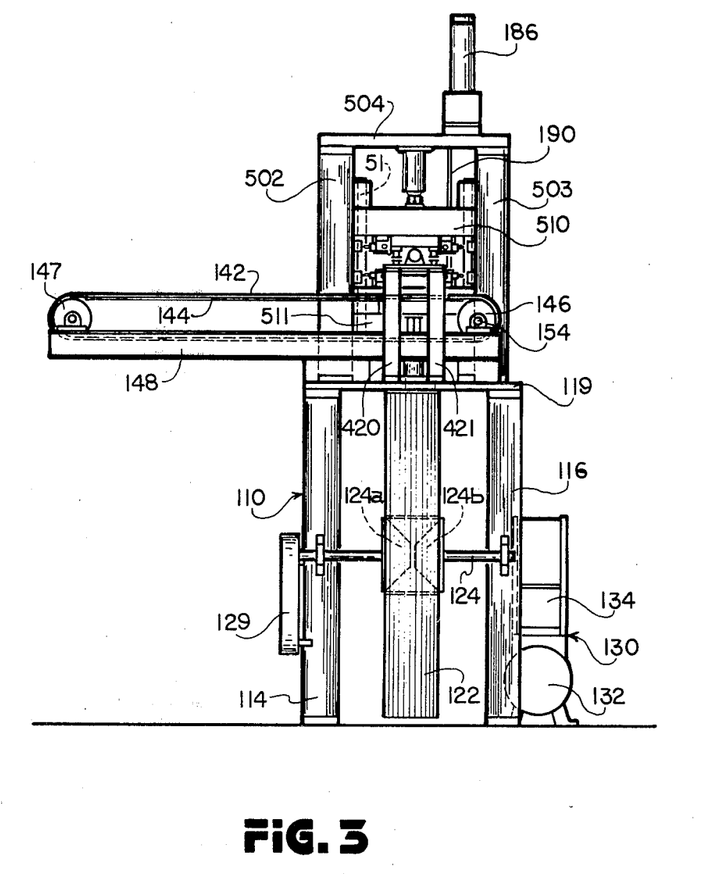
FIG. 3 is a rear elevation of the apparatus illustrated in FIGS. 1 and 2 generally showing the output side of the apparatus.

Referring now in particular to FIG. 2, the preferred embodiment apparatus of the present invention, designated generally 100 in FIG. 2, is additionally seen to comprise a pre-creasing means designated generally 250 for pre-creasing the separator material prior to the folding thereof; material cut-off means designated generally 300 for severing the separator material into predetermined lengths; plate feed means designated generally 450 for feeding successive pre-pasted battery plates to the injector shuttle designated generally 220; stuffer guide means for guiding the separator material to fold around each plate as each plate is moved therebetween by the injector means; sealing means designated generally 500 for sealing the protruding edges of separator material extending beyond the side edges of the plate around which it has been folded; and, extractor shuttle means, designated generally 400, for receiving the plate and separator material prior to sealing and for removing each enveloped plate from the sealing means 500 after sealing, and for depositing the enveloped plate on the output means designated generally 140.

Briefly, the method of operation of the machine may be explained as follows. Referring in particular to FIG. 2, a material feed roll 122 is placed on a material feed roll axle 124 which axle is intermittently driven by feed roll motor 126 which acts on axle 124 through feed roll drive train 129. Centering members 124a and b on the axle 124 allow a full roll to be rolled to the machine and lifted into position by moving the members 124a and b together to lift the roll into the position shown in FIG. 2. The feed roll motor 126 is intermittently activated to generally unwind the separator material by means of the interference between the separator material 125, feed roll limit arm 128, limit arm roller 127 and the feed roll limit switch 123 which is activated thereby. Accordingly, the separator material 125 may be seen to be fed to the remainder of the apparatus by the material feed means in that the feed roll limit arm 128 and feed roll limit arm roller 127 act as a pendulum which tends to move towards the vertical position, thereby taking up slack in the separator material disposed between the feed roll and processing portion of the apparatus. When the draw means designated generally 180, and more particularly jaws 182 thereof, engage the separator material to draw each successive length into the processing position, the limit arm roller 127 is caused to move to the right, the limit switch 123 closed as a result thereof and motor 126 activated to unwind sufficient material to open limit switch 123. Accordingly, it may be seen that at substantially all times, the separator material 125 disposed between the limit arm feed roller 127 and jaws 182 is disposed in a substantially vertical plane. Accordingly, it may be seen that as material is required it is automatically fed from material feed roll 122 into a position disposed substantially linearly below the separator processing position which will be described more fully hereinafter.

With the exception of the material feed means designated generally 120 and the compressor means designated generally 130, the bulk of the operative portion of the preferred embodiment apparatus is disposed above base plate 119 which is supported by the base designated generally 110 which comprises legs 112, 114, 116 and 118 and clearance plate 117. Substantially centrally disposed on the base plate 119 as seen in FIG. 2 is the sealing means designated generally 500 which comprises a plurality of upstanding main support members 502 and 503, across the top of which is connected a main transverse member 504, which members define with the aforementioned base plate 119 a substantially rectangular aperture in which are disposed the remaining components of the sealing means, which components will be described more fully hereinafter. Basically, the sealing means comprises upper and lower sealing heads 510 and 511 which reciprocate during the sealing process to successively engage, seal and release separator encased plates disposed therebetween.

Disposed to one side of the sealing means 500 and extending in a plane substantially parallel to the axis of the main support members 502 and 503 and transverse to the opening defined between upper and lower sealing heads 510 and 511, is the separator material to be processed into envelopes. The separator material more particularly extends through a rectangular slot defined in the base plate 119, which separator material is drawn substantially vertically upwardly from its point of passage through the base plate 119 by draw means 180. During the operation of the device, the draw means by way of jaws 182 draw the separator material over the opening defined by upper and lower sealing heads, and more particularly over and adjacent to the stuffer guide means designated generally 600 which will guide the folding operation shortly thereafter. Once in this position, which for purposes of convenience will be referred to as the separator processing position, the pre-creasing means designated generally 250 will be activated to crush a portion of the separator material between punch and die portions thereof. The engagement of the separator material by the pre-creasing means 250 will preferably continue during which time the material cut-off means designated generally 300 will be activated to sever the separator material between the creasing means 250 and jaws 182 at a length which is appropriate for folding around each of the pre-pasted battery plates to be processed. Once severed, this portion of separator material is maintained in the separator processing position by a plurality of retaining means, pending activation of the injector shuttle means, as will be described more fully hereinafter. The remaining portion of the separator material, that is, the portion disposed between the material cut-off means and the roll will similarly be retained by material guide means 650 and, preferably, also by auxiliary retaining means disposed in the aperture formed in base plate 119 through which the separator material 125 passes.

Following cut-off, battery plates which have been inserted into plate feed means 450 are successively engaged by injector shuttle means 220 and are driven into engagement with the severed piece of separator material located at the separator processing position. Since the pre-creasing means is located at a position below the cut-off means which is approximately one-half of the distance of the predetermined length which is severed, each severed piece of separator material disposed at the processing position will contain a crease which is centered over the opening defined by the stuffer guide means 600 and/or the upper and lower sealing heads 510 and 511. As the bottom edge of each pre-pasted battery plate engages the separator material, the pre-creasing of the separator material will tend to locate the crease of the separator material along that edge of the battery plate, which is then further moved along a plane substantially perpendicular to the plane of the separator material. As the injection process continues, the stuffer guide means designated generally 600 in FIG. 2 will gently fold the separator material along the faces of the battery plate, which gentle folding is aided by the gradual release of the severed separator material by the various retaining means. The battery plate and separator material folded therearound are injected into a position substantially centered between upper and lower sealing heads 510 and 511, which heads are then in their fully retracted positions. The heads are then caused to close towards the separator material, initially to flatten the separator material out across the face of the battery plates, and then to seal the edges of the separator material which protrude beyond the side edges of the plate so that each battery plate is enclosed on three sides. While the plate and separator material is engaged and held by the sealing means, the injector shuttle means, designated generally 220, a portion of which was between the folded separator material, is withdrawn. The extractor shuttle designated generally 400 is preferably disposed between the sealing heads 510 and 511 to additionally engage the battery plate having separator material therearound upon its initial injection between the upper and lower sealing heads 510 and 511 and to aid in completing the folding process. Alternatively, the extractor shuttle may be activated to first engage the plate and separator material disposed between the sealing heads following the engagement thereof by the head. In either instance, once the sealing operation has been completed and the upper and lower sealing heads 510 and 511 have been moved to their retracted positions, the now fully enveloped battery plate is engaged and supported solely by the extractor shuttle, which cycles to draw the enveloped plate out from between the sealing heads 510 and 511 to deposit the enveloped plate on a suitable output means 140 such as output conveyor 142. As soon as the injector shuttle has withdrawn to the opposite side of the plane defined by the separator material in the separator processing position, the draw means 180 may be extended and the jaws 82 activated to engage that separator material which is disposed within the material guide means 650. The jaws 182 are then activated to grip the separator material and pull the separator material to the position illustrated in FIG. 2, which activity may proceed during the completion of the aforementioned sealing, extraction and output process for the previous plate.

Figure 5:
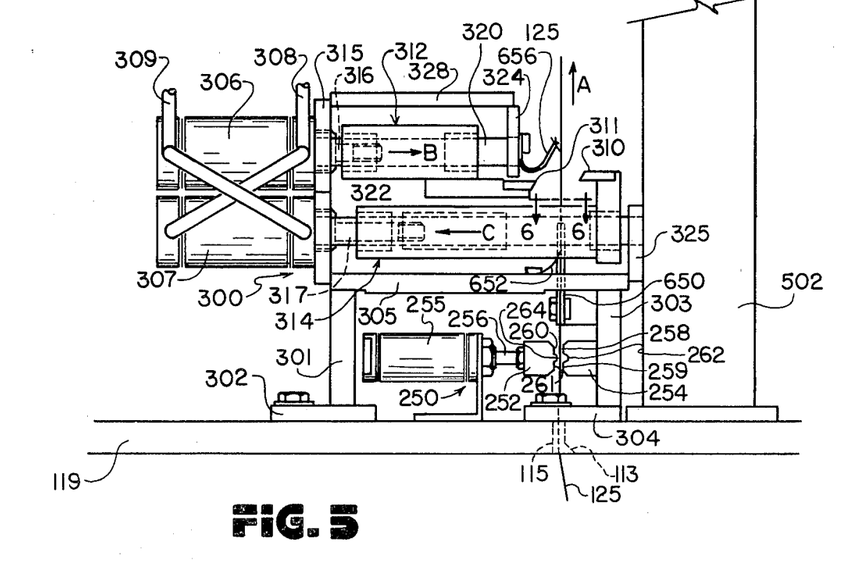
FIG. 5 is a greatly enlarged side view of a portion of the apparatus illustrated in FIG. 2 taken as indicated by the broken circle and arrow 5 in FIG. 2.

Having generally described the basic elements of applicant's preferred apparatus, and the method by which that apparatus functions, particular attention will now be directed to the structure and mode of operation of each of the aforementioned means, which together cooperate to function in the above described manner. Referring now in particular to FIG. 5, the separator material 125 is illustrated passing substantially vertically through the substantially rectangular aperture 115 formed in the base plate 119. The aperture 115 is further provided with a beveled portion 113 so that the separator material will not be creased or damaged as tension between the feed roll and draw means increases as the separator material is drawn by the draw means in a direction as indicated by arrow A in FIG. 5. As mentioned above, also disposed within aperture 115 is preferably means for preventing separator material from traveling in a direction generally opposite to the direction indicated by arrow A in FIG. 5, that is, means for preventing the separator material from dropping back through aperture 115 is preferred. Located substantially above the aperture 115 is the pre-creasing means designated generally 250 which comprises a punch portion 252 and die portion 254 which are adapted to matably engage each other with the separator material therebetween when the pre-creasing means is in its activated position. Movement of the punch portion 252 is accomplished by activation of pre-creasing cylinder 255 which drives cylinder rod 256 reciprocally toward and away from die 254. It is contemplated that the pneumatic pulse which is utilized to activate the pre-creasing means may, by means of a flow control delay mechanism, also activate the material cut-off means which is located generally above and along the line of travel of the separator material 125. The punch 252 is substantially longitudinal and extends across the full width of the separator material, as does die 254. The upper and lower edges of punch 252 and 254 are beveled to additionally act as guides for the separator material passing therebetween whereas substantially parallel clamping surfaces 258 and 259 on the die 254 and 260 and 261 on the punch 252 are formed on either side of the creasing areas of the respective punch and die. The die is mounted substantially contiguously to one of the surfaces of separator material 125 having a flat channel 252 formed therein which is beveled towards the aforementioned clamping surfaces. The width of the channel 262 is substantially equal to the width of the bottom edge of a pre-pasted battery plate. A complementarily configured ridge or rib 264 is formed on the punch 252 and is complementally beveled towards the clamping surfaces 260 and 261 of the punch 252. The purpose of the pre-creasing mechanism in the preferred embodiment is three-fold. First, a dual crease is formed in the separator material at parallel locations spaced apart by approximately the width of the bottom edge of the battery plate to be processed. Secondly, the longitudinal ribs of the separator material are crushed by means of the striking action of the punch 252 against the die 254, and, more particularly, those ribs and crushed particularly along the lines of separator material which are engaged at the intersection of the flat portion of ridge 264 and the beveled portions of that ridge which extend towards clamping surfaces 260 and 261. Thirdly, since the pre-creasing means is activated and held in the activated position during the firing of the material cut-off means, the separator material is firmly clamped on either side of the cut-off means during the cutting operation.

The material cut-off means designated generally 300 is disposed generally above the pre-creasing means partially on pedestal supports 301 and 302 which are disposed on the side of the separator material 125 which is remote from the sealing means, and partially on pedestal supports 303 and 304 which are disposed between the separator material 125 and the sealing means. Disposed on the pedestal supports 301–304 is material cut-off base plate 305 which, in addition to supporting the material cut-off means designated generally 300, further acts as a support for retaining spring 652. Pedestal supports 303 and 304 further act to support pre-creasing die 254 and the material guide means designated generally 650 which is disposed through an aperture formed in the material cut-off base plate 305, which assembly is shown on a greatly enlarged scale in FIG. 6. The material cut-off means designated generally 300 comprises a plurality of material cut-off cylinders 306 and 307 which are supplied by pneumatic lines 308 and 309 so that these cylinders may be actuated in a double-acting manner. These cylinders are adapted to reciprocally activate cut-off blades 310 and 311 which are disposed on opposing sides of the separator material. These cut-off blades ride on upper and lower blade carriages designated generally 312 and 314, respectively, so that upon activation of the material cut-off means, the upper carriage 312 causes blade 311 to move along an axis parallel to and in the direction of arrow B shown in FIG. 5 while the lower carriage 314 will correspondingly move along an axis parallel to and in the direction of arrow C shown in FIG. 5 so that the blades meet and sever the separator material in a scissors-like fashion without materially distorting the position of the plane of that separator material. Material cut-off cylinders 306 and 307 are mounted through cut-off cylinder mounting plate 315, having their cylinder rods 316 and 317 extending therethrough to engage the aforementioned carriages 312 and 314. Extending away from cut-off cylinder mounting plate 315 are two sets of tracking rods, upper tracking rods 320 and 321 and lower tracking rods 322 and 323. Upper and lower terminal plates 324 and 325, respectively, engage the terminal portions of the respective upper and lower tracking rods to support the ends thereof which are remote from the cut-off cylinder mounting plate 315. The upper tracking rods 320 and 321 are seen to terminate at terminal plate 324 which is located on a first side of the separator material 125 and which additionally has mounted thereon lower stuffer guide retaining spring 656. Terminal plate 324 is supported by upper carriage plate 328 while terminal plate 325 may be directly mounted on main supports 502 and 503, or alternatively, on plate 305, or both, as illustrated in FiG. 5.

Figure 11:
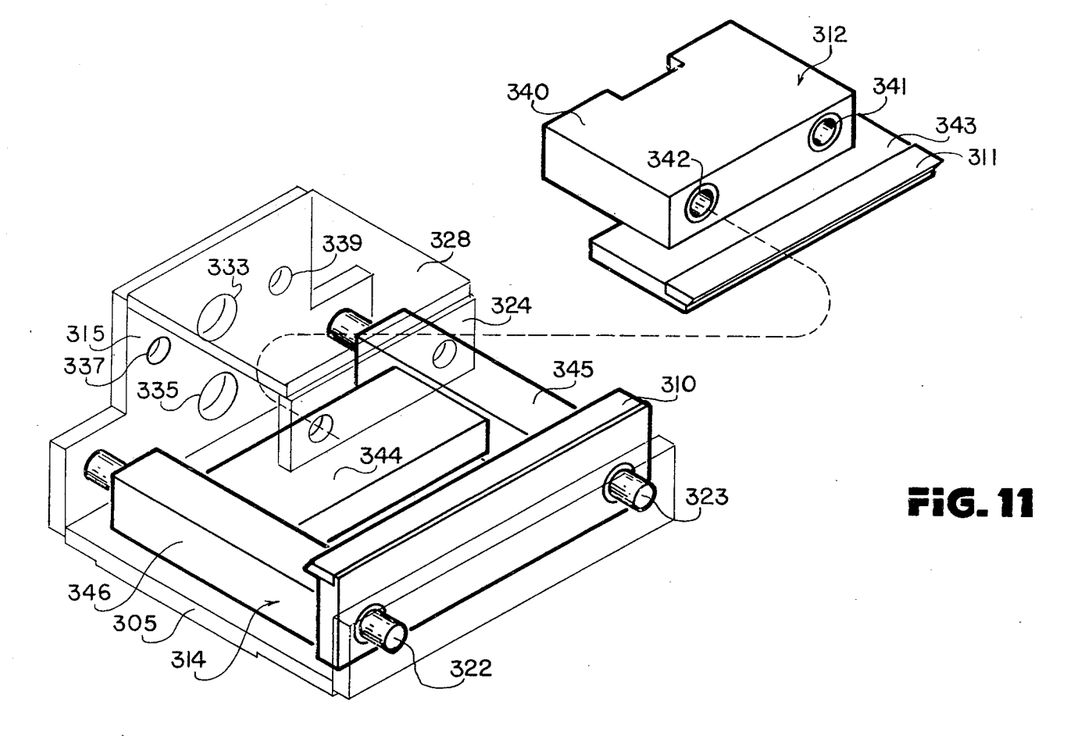
FIG. 11 is a greatly enlarged partially exploded perspective view of a portion of the cut-off means illustrated in FIG. 5.

Referring more particularly to FIG. 11 which is a greatly enlarged partially exploded perspective view of a portion of the material cut-off means of the present invention, the inter-relationship of the upper and lower carriages 312 and 314 is clearly illustrated. The cut-off cylinder mounting plate 315 is illustrated in FIG. 11 havng upper and lower apertures 333 and 335 adapted to be engaged and pierced by the respective upper and lower cut-off cylinders 306 and 307, respectively. Apertures 337 and 339 located in plate 315 are adapted to receive guide rods 320 and 322, which are not illustrated in FIG. 11. Similar apertures are provided to receive the remote ends of those rods in terminal plate 324 whereas carriage block 340 of the upper carriage means is provided with bushings 341 and 342 in which rods 320 and 321 are journalled. Blade 311 is mounted on blade mounting plate 343 which engages and is attached to the underside of carriage block 340 for movement therewith. The lower cut-off carriage designated generally 314 must span the separator material which is disposed between blade 310 and transverse lower cut-off carriage block member 344. Accordingly, rods 322 and 323 are parallel to, but spaced further apart from each other than corresponding guide rods 320 and 321 of the upper plate carriage assembly. Accordingly, the cylinder rod 317 of the lower cut-off cylinder 307 engages the transverse carriage block member 344, which in turn drives longitudinal carriage members 345 and 346 in a reciprocal manner along rods 322 and 323 such that separator material which has been threaded therethrough is severed in a scissors-like action as the leading edges of blades 310 and 311 move together and slide slightly across one another to ensure a clean shearing action. As discussed above, the efficiency of the shear produced by activation of the material cut-off means is further enhanced by the fact that the separator material is clamped between the clamping surfaces of the punch 252 and die 254 of the pre-creasing mechanism at the time the cut is effected. Additionally, the spacing between the cut effected by blades 310 and 311 and the creasing which is effected by the pre-creasing means designated generally 250 is, in one preferred embodiment, half of the distance from the shearing point to the terminal edge of the separator material which is held between jaws 182. In an alternate embodiment where a plate is affixed to the ejector means, which will be discussed hereinafter, so that empty envelopes are made, it is preferred to decrease or increase the distance between the cut-off point and the creasing point so that upon subsequent folding of the separator material into the envelope shape, the terminal edge of the separator material will not precisely register with the edge of the separator material cut by the blades, to form a slight lip, preferably having a dimension of between 30 and 60 thousandths of an inch, whereupon the manual or automatic insertion of a pre-pasted battery plate into that envelope will be greatly expedited due to the ease of locating the envelope opening by sliding a pre-pasted plate thereacross.

Figure 4:
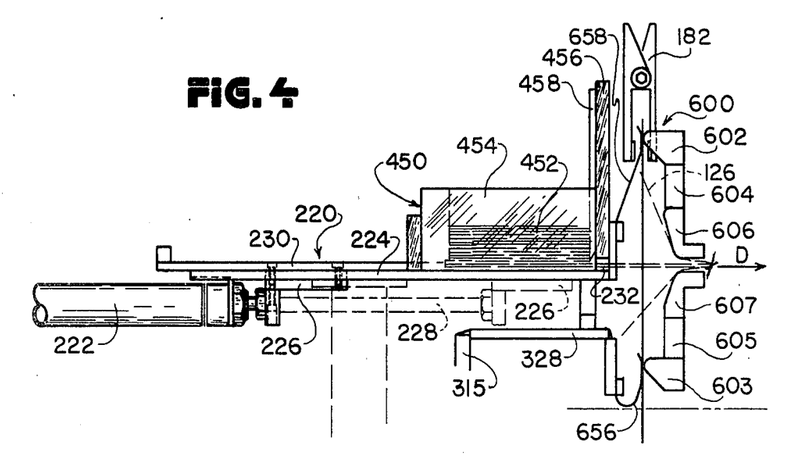
FIG. 4 is a greatly enlarged fragmentary side view of the input means of the present invention taken as indicated by the broken lines and arrow 4 in FIG. 2.

Referring now to FIG. 4 which illustrates the injector shuttle means designated generally 220, the plate feed means designated generally 450, the stuffer guide means designated generally 600, the upper and lower stuffer guide retaining springs 656 and 658 and jaws 182 of the draw means 180; that portion of the apparatus is illustrated which is responsible for introducing pre-pasted plates into contact with distinct lengths of pre-creased separator material which are caused to fold therearound as the injector shuttle 220 moves to its fully extended position along the axis and in the direction indicated by arrow D in FIG. 4. As with the pre-creasing means, designated generally 250, and material cut-off means, designated generally 300, the injector shuttle means, designated generally 220, acts along an axis substantially perpendicular to the plane of the separator material in the separator processing position. Accordingly, it may be seen that the axes of travel of the cylinder rods of the injector shuttle cylinder 222, upper and lower cut-off cylinders 306 and 307 and pre-creasing cylinder 255 are all co-planar, the plane of which is also substantially perpendicular to the face of the separator material. Pre-pasted battery plates 452 are stacked within the plate feed means for feeding plates to the injector shuttle means. Within a suitable rectangular stacking column comprised of stacking column side walls 454 and safety shield 456, a comb 458 is adjustably mounted on safety shield 456 to define the slit width of the aperture formed between the safety shield 456 and injector base plate 224. The purpose of this comb is to allow only a single pre-pasted plate to be taken from the bottom of the stack by the injector shuttle 226 during the injection stroke of that shuttle. Once a pre-creased, severed piece of separator material 126 is located in the position shown in FIG. 4, injector shuttle cylinder 222 is activated to move from the solid lined position through the position shown in phantom in FIG. 4, wherein the cylinder rod 228 has moved towards the fully extended position. The shuttle 226 tracks along injector shuttle base plate 224 and has a ridge 230 defined thereon extending upwardly therefrom which is adapted to engage and guide the single pre-pasted plate through aperture 232 into engagement with the crease in separator material 126 to draw that separator material through the position shown in phantom in FIG. 4 wherein the separator material 126 has begun to fold around the pre-pasted plate and that portion of the injector shuttle assembly which is engaging, guiding and supporting that plate in this position. Accordingly, the stuffer guide means designated generally 600 which extends longitudinally between the main supports 502 and 503 and is mounted thereon basically comprises separator retaining fingers 602 and 603, retaining finger support portions 604 and 605 and separator guide blocks 606 and 607. In the separator processing position, springs 658 and 656 retain the separator material 126 against fingers 602 and 603 of the stuffer guide means with approximately equal tensions so that upon engagement of the center of the separator material by the pre-pasted plate, the separator material will be uniformly pulled away from each spring into the position shown in phantom and between the rectangular slit-like aperture defined between stuffer guide blocks 606 and 607.

Figure 6:
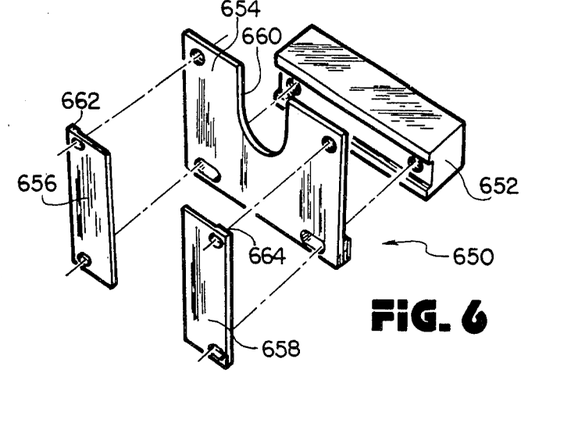
FIG. 6 is a greatly enlarged exploded perspective view of the separator guide means generally disposed under the lines and arrows 6—6 in FIG. 5.

In addition to achieving the vertical alignment of the separator material with respect to the injector shuttle and aperture formed between the aforementioned guide blocks, it is also of importance that the proper lateral alignment of the separator material be accomplished so that upon folding of the separator material around the plate, the plate is centered within the material and a substantially equal amount of overlap is available on either side of the plate to facilitate the heat sealing process. Accordingly, material guide means designated generally 650 and illustrated in an exploded view in FIG. 6 is provided for laterally aligning and guiding separator material into the separator processing position, which means functions as follows. As described above, when material is to be brought into the separator processing position, the jaws 182 of the draw means move vertically downwardly to engage the separator material which remained following the previous cutting operation. Once the draw means is fully extended and the jaws are activated to grip the protruding separator material, the draw means may be retracted to draw a preselected length of material into the separator processing position. Since the jaws 182 reciprocate along a linear axis, the position of the separator material disposed immediately below the cut-off means will similarly establish the position of the upper end of that separator material as the separator material is drawn into the separator processing position. Accordingly, the material retaining or guide means designated generally 650 is mounted between the creasing means designated generally 250 and the cut-off means designated generally 300 to establish the lateral position of the separator material and to hold the separator material in the desired position pending its engagement by jaws 182. Accordingly, a spacer 652 has mounted thereon a separator guide plate which cooperates with two lateral separator tracking plates 656 and 658 to define a separator chase therebetween. A U-shaped cut-out defined adjacent the upper edge of the separator guide plate 654 is provided so that the jaws will engage the separator material within that cut-out portion, thereby absolutely insuring precise lateral alignment of the separator material as the draw means is retracted to pull the separator material into the separator processing position. As seen in FIG. 6, the separator guide chase is defined between the opposing surfaces of the separator guide plate 654, the lateral guide plate tracking members 656 and 658 and the longitudinal bosses 662 and 664 formed thereon.

Figure 7:
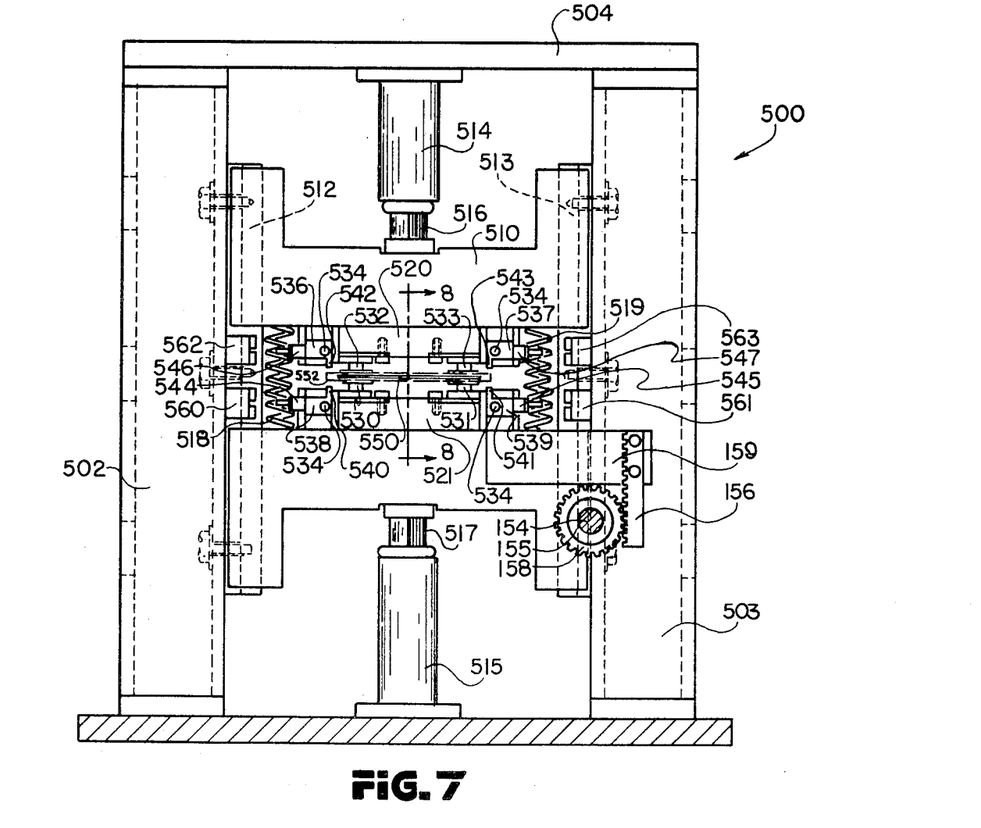
FIG. 7 is an enlarged cross-section taken as indicated by the lines and arrows 7—7 in FIG. 2.
Figure 8:
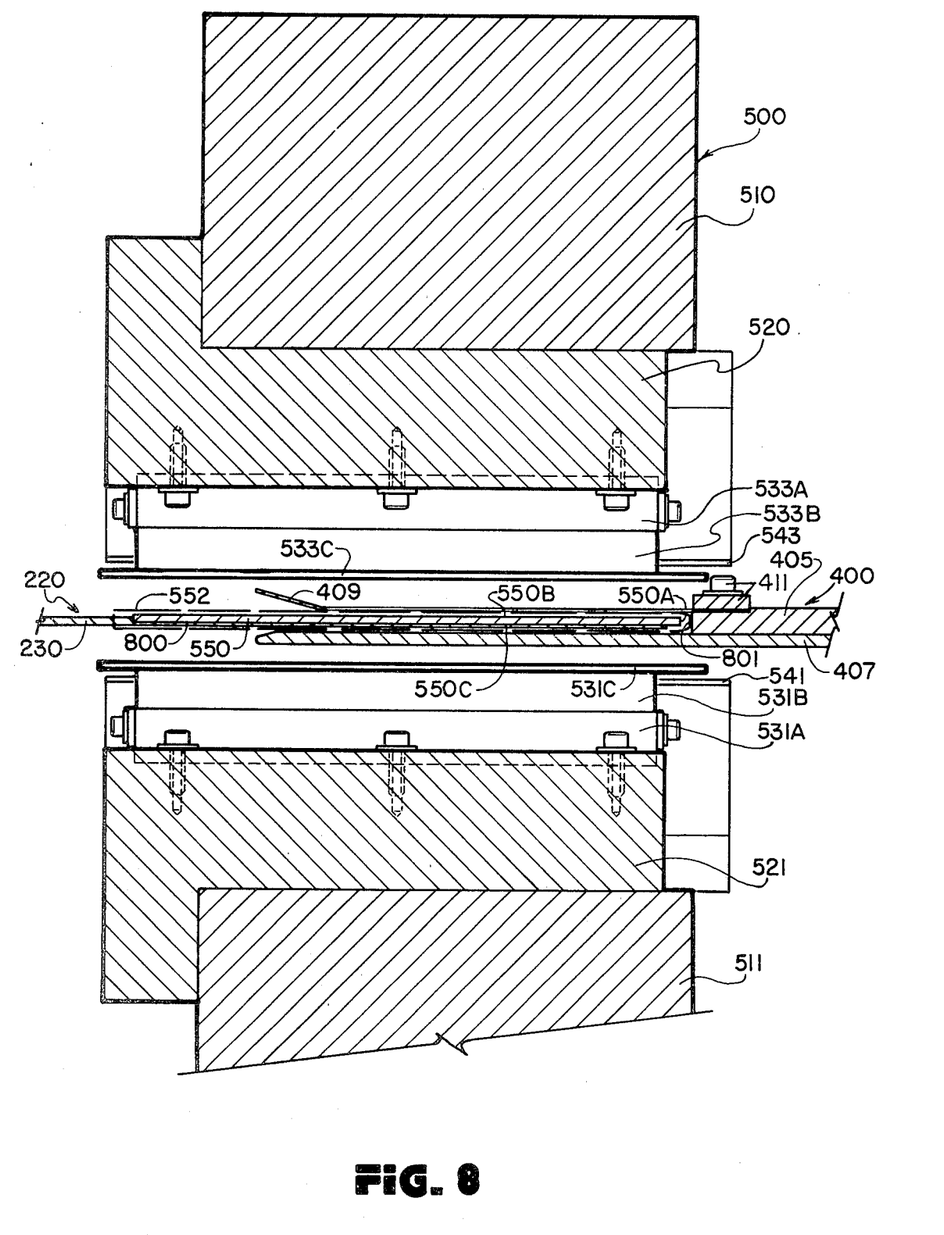
FIG. 8 is a greatly enlarged cross-section of the preferred embodiment apparatus illustrated in FIG. 7 taken as indicated by the lines and arrows 8—8 in FIG. 7.
Figure 9:
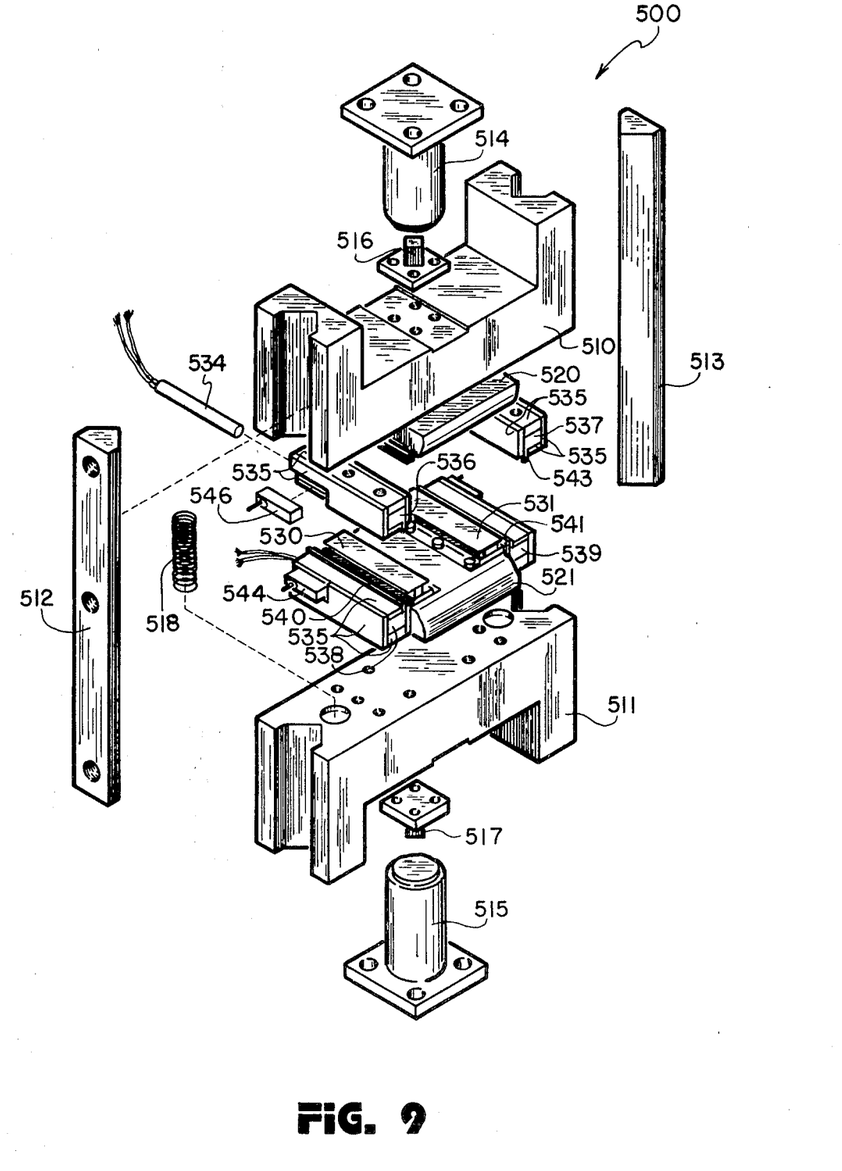
FIG. 9 is an exploded perspective view of a portion of the apparatus illustrated in FIG. 7, the main support members, the main transverse member and supporting plate having been removed for purposes of clarity.

Referring now in particular to FIGS. 7, 8 and 9, the preferred embodiment sealing means of the present invention is illustrated. As seen in FIG. 2, the sealing means of the present invention designated generally 500 is located adjacent to the stuffer guide means designated generally 600 so that the injector shuttle means designated 200 may, when fully extended, push a pre-pasted plate with a piece of separator material wrapped therearound between upper and lower sealing heads 510 and 511. The overall arrangement of the sealing means is well illustrated in FIGS. 7 and 9. The sealing means designated generally 500 in these figures basically comprises a pair of main support members 502 and 503 within which upper and lower sealing heads 510 and 511 track along sealing head tracks 512 and 513. The upper and lower sealing heads are moved relative to each other and relative to a plate disposed therebetween by means of the action of hydraulic cylinders 514 and 515 through their respective hydraulic cylinder rods 516 and 517. Heads 510 and 511 are biased towards their retracted positions by head springs 518 and 519 disposed therebetween. Mounted on the opposing surfaces of each of the upper and lower sealing heads 510 and 511 are upper and lower sealing head mounting blocks 520 and 521, respectively. Mounted in opposing relationship on the opposing surfaces of these mounting blocks 520 and 521 are two pairs of pressure pads, lower pressure pads 530 and 531 and upper pressure pads 532 and 533. These pressure pads basically comprises spring biased surfaces which are adapted to initially engage each layer of separator material 552 and press those layers againt each face of plate 550 which is disposed therebetween as the upper and lower sealing heads 510 and 511 move together during the sealing process. As illustrated in FIG. 7, these pressure pads are disposed parallel to and relatively close to the plate edges so that upon movement of the heads to the fully closed position, the edges of separator material 552 to be sealed will be appropriately located. Disposed laterally adjacent to mounting blocks 520 and 521 are two pairs of heat sinks, upper heat sinks 536 and 537 and lower heat sinks 538 and 539. Each of these heat sinks have sealing edges 542, 543, 540 and 541 disposed thereon which are thin longitudinal ribs having opposing flat surfaces extending longitudinally for a distance at least equal to the length of seam to be prouced to seal the opposing edges of separator material disposed therebetween, to form an envelope, and having widths sufficient to produce a seam in the finshed product posessing suitable strength and durability characteristics. Disclosed within each heat sink are cartridge heaters 534, each of which is controlled by a thermostat mounted in direct heat transfer relationship to one of the surfaces of that heat sink. As seen in FIGS. 7 and 9, thermostats 546, 547, 544 and 545, are mounted respectively on external surfaces of heat sinks 536, 537, 536 and 539, respectively. As illustrated in FIG. 7, except for the sealing edges, the remainder of heat sinks 536, 537, 538 and 539 are enveloped, except for the aforementioned thermostats, by insulation 535 such as asbestos heat or other material which will tend to prevent heat loss from the heat sinks except through the sealing edges.

Finally, the sealing means comprises a pair of sealing head tracks 512 and 513 mounted on the interior opposing surfaces of main support members 502 and 503, which tracks have a pentagonal cross-section and which are adapted to slidingly engage complementally configured channels formed in the sides of upper and lower sealing heads 510 and 511. As mentioned above, when hydraulic cylinders 511 and 515 are not activated, head springs 518 and 519 force the upper and lower sealing heads 510 and 511 towards main transverse member 504 and base plate 119, respectively. The maximum distance of travel of these heads towards the retracted position is, of course, limited by the interference between portions of the hydraulic rods 516 and 517 with the cylinders 514 and 515, as illustrated in the drawings. After a plate 550 has been inserted between the sealing means with enveloped material 552 disposed therearound with the overlapping free edges thereof disposed on the left and right of the plate as seen in FIG. 7, the hydraulic cylinders 514 and 515 are activated to move each of the upper and lower sealing heads 510 and 511 towards the plate 550 and separator material 552 whereupon the initial engagement between the sealing means and the separator material occurs when the upper and lower pressure pads 530, 531, 532 and 533 contact the separator material. As the heads 510 and 511 continue to move together, the pressure pads, which are spring biased and therefore begin to retract relatively towards their respective mounting blocks 520 and 521, the sealing edges 542, 543, 540 and 541 contact and press together the opposing overlapping portions of separator material to press that material together and melt the same. While the temperature and pressure required for each particular separator material may vary somewhat, pressures of about 3000 to 4000 pounds per square inch of melting surface contact area at temperatures of approximately 300° to 350° have been found to be most suitable for use when sealing conventional separator materials. In order to protect opposing sealing edge surfaces in the face of such pressures, the heat sinks 536, 537, 538 and 539 are milled, preferably from aluminum block, to form the sealing edges thereon, which are edges subsequently hard surface anodized, at least in the contact melting areas. This hard surface anodization is believed to provide superior anti-stick, durability and sealing characteristics when used in the preferred embodiment apparatus. To further insure that the enveloped seams are formed within the plane of the plate, lower head stops 560 and 561 and upper head stops 562 and 563 prevent the upper and lower heads 510 and 511 from tracking beyond the preferred seam forming point. Accordingly, the sealing edges may each advance up to, but may not pass through, the plane of the plate, thereby assuring that even seams will be formed.

Referring now to FIG. 8, the inter-relationship between the sealing means designated generally 500, the injector shuttle designated generally 220 and the extractor shuttle designated generally 400 is clearly illustrated in combination with a plate 550 having separator material folded therearound. The remote end of the injector shuttle is seen to comprise a relatively thin separator support plate 800 which extends away from injector shuttle plate 230, a ledge formed therebetween being adapted to engage and cause the advancement of each plate removed from the plate feed means and subsequently enveloped around the bottom edge 550*a* and along faces 550*b* and *c*, except of course in the area wherein face 550*c* rests against the surface of plate support 800. As shown in FIG. 8, the injector shuttle is in its fully extended position and the pre-creased portion of the separator 801 abuts an edge of main extractor plate 405, which extractor plate has a thickness which is substantially equal to the combined thicknesses of plate support 800, battery plate 550 and the two layers of separator material 552 wrapped therearound. An evelope support member 407 is attached to the undersurface of main extractor plate 405 and extends generally away therefrom towards the injector shuttle to initially cooperate therewith to support the plate and separator material within the sealing means, and to subsequently support the enveloped plate following retraction of the injector shuttle, as will be described more fully hereinafter. An extractor shuttle grip spring 409 is additionally fastened to an opposing surface of main extractor plate 405 by hold-down means 411. The extractor shuttle grip spring 409 also extends generally away from the main extractor plate 405 and is sprung generally towards envelope support member 407, but is forced into the position shown in FIG. 8 when the plate, separator material and plate support are slid therebetween as illustrated in FIG. 8. Accordingly, one of the purposes of the extractor shuttle grip spring 409 in combination with the envelope support member 407, which has a beveled tip, is to receive the plate with the separator material mostly folded theraround to complete the folding thereof prior to the activation of the upper and lower sealing heads 510 and 511.

Figure 10:
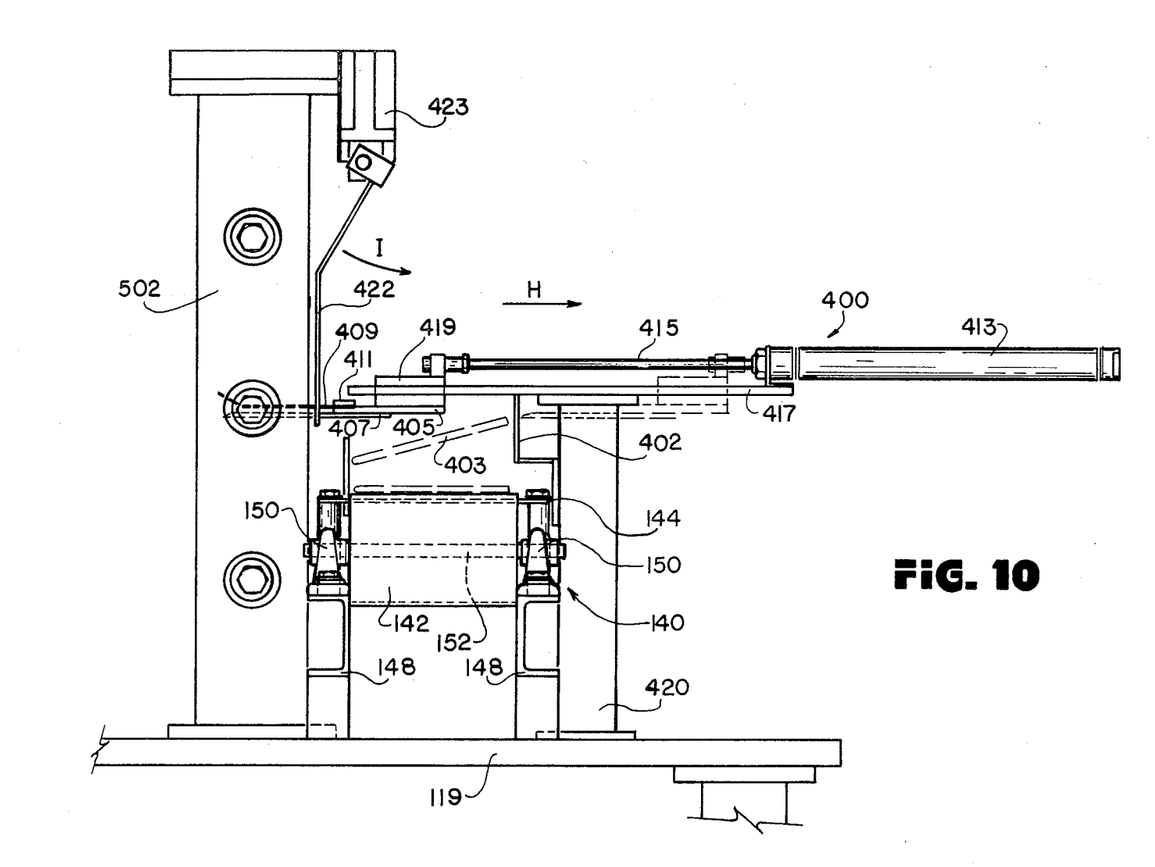
FIG. 10 is a greatly enlarged side view of a portion of the apparatus illustrated in FIG. 2 taken as indicated by the broken lines and arrow 10 in FIG. 2.

Referring now to FIG. 10, the inter-relationship between the extractor shuttle means designated generally 400 and the output means designated generally 140 is clearly illustrated. In addition to the portions of the extractor shuttle described in connection with FIG. 8 above, the extractor shuttle means is seen to comprise extractor shuttle cylinder 413, extractor shuttle rod 415, extractor shuttle tracking plate 417 and extractor shuttle carriage 419 from which is suspended main extractor plate 405. The extractor shuttle means 400 is generally supported by output pedestals 420 and 421 extending between mounting plate 119 and extractor tracking plate 417. In FIG. 10, the extractor shuttle is shown in a position wherein the extractor shuttle cylinder rod 415 is nearly fully extended. The retraction of that shuttle with an enveloped plate therebeween in the direction of arrow H in FIG. 10 to engage and cause extractor limit switch arm 422 to move in an arc as indicated by arrow I in FIG. 10, which extractor limit switch arm in turn triggers extractor limit switch 423 to indicate that the plate which previously underwent the sealing process has now successfully been withdrawn from between the heads. As the extractor shuttle continues to move in the direction of arrow H towards the fully retracted position shown in phantom in FIG. 10, plates which are retained between extractor shuttle grip spring 409 and envelope support member 407 interfere with envelope knock-off arm 402 to cause the enveloped plate such as enveloped plate 403 shown in broken outline in FIG. 10 to drop onto the output means designated generally 140 in FIG. 10. The output means of the present invention generally comprises an output belt 142, the top surface of which is supported by an output support plate 144. The output belt 142 is supported and disposed at either end around output belt rollers 146 and 147. The output belt rollers 146 and 147 are mounted on output roller axles 152 and 154 having output roller pillow blocks 150 disposed on either end thereof, which blocks are mounted on output members 148. Referring now to FIG. 7, the means for advancing the output belt is illustrated which comprises an output ratchet plate 159, which is fixedly mounted on lower head 511 for movement therewith, which mounting plate has disposed thereon output rack gear 156 which engages and co-acts with output ratchet gear 158. This output ratchet gear 158 is attached to output roller axle 154 by a single direction clutch 155 or ratchet assembly which causes axle 154 to rotate in only one direction in order to periodically advance output belt 142. As lower sealing head 511 reciprocates between the open and closed position, output rack gear will similarly reciprocate along the vertical axis to cause complemental reciprocal rotation of the output ratchet gear 158 which is translated into single direction movement of the output belt which receives plates deposited by the extractor shuttle means. In an alternate embodiment of the present invention, plate feed means 450 may be eliminated and the total effective thickness of the separator support plate increased to substantially equal the thickness of a pre-pasted battery plate. In this instance, the ledge formed between the separator support plate 800 and the shuttle plate 230 is eliminated and the alternate embodiment machine will function to produce empty battery plate envelopes which may be formed at one location and shipped to appropriate battery assembly locations for subsequent manual or automatic insertion of pre-pasted plates therein. As discussed above, in this alternate embodiment it may be preferred to relocate the pre-creasing means so that the action thereof occurs slightly off-center with respect to the length of separator material to be subsequently severed by the material cut-off means. Accordingly, when the fold is effected, the two edges of separator material will not precisely register, thereby leaving a lip of preferably 30 to 60 thousandths of an inch which increases the ease of locating the opening of the separator envelope merely by drawing a plate thereacross.

Accordingly, it may be seen that the above described apparatus may easily be operated by a single tender in the instance where that apparatus is utilized to envelope pre-pasted battery plates, and that the operator of the apparatus need only load plates in the plate feed means and remove enveloped plates from the output belt. Since each roll of separator material is capable of making thousands of separator envelopes, when the alternate embodiment apparatus used for making empty envelopes is employed, a single operator may tend banks of such apparatuses simply by periodically collecting empty envelopes produced thereby and periodically replacing feed rolls to these machines. From the above description, it may be seen that a rapid, efficient, reliable apparatus is provided which produces uniform enveloped pre-pasted battery plates with extremely durable side seams.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. A method for forming lead-acid storage battery separator envelopes from a continuous roll of separator material of the type having ribs thereon, said method comprising the steps of:

(a) withdrawing separator material from said roll;

(b) clamping said withdrawn separator material along the length thereof to crush and deform said separator material ribs and produce two creases therein across the width thereof, said creases being spaced from each other approximately the thickness of a pasted battery plate;

(c) releasing said clamping;

(d) introducing the edge of a plate narrower in width than said separator material into contact with said separator material at said crushed and deformed portion thereof between said spaced creases;

(e) folding said withdrawn separator material along the length of said plate, whereby said material overlaps the edges of said plate; and (f) sealing said overlapped edges to each other.

2. A method as claimed in claim 1, further comprising severing said separator material withdrawn from said role before said clamping is released.

3. A method as claimed in claim 2, wherein said separator material extends from each of said creases at least the length of a battery separator plate.

4. A method as claimed in claim 3, where in said separator material extends from one of said creases a distance 0.015–0.060 of an inch longer than the length of a battery separator plate.

5. A method as claimed in claim 1, wherein said sealing step comprises heat sealing said overlapped edges.

6. A method as claimed in claim 5, wherein said heat sealing step comprises bringing anodized aluminum contact melting surfaces into contact with at least portions of said overlapped edges.

7. A method as claimed in claim 6, wherein said melting surfaces are heated to 300°–450° F. and a pressure of 3,000–4,000 p.s.i. of melting surface contact area is applied.

8. A method as claimed in claim 1, wherein said separator material is retained under tension during the folding of said material along said plate.

9. A method as claimed in claim 1, further comprising laterally retaining said material in position after it is severed.

* * * * *